United States Patent
Gao et al.

(10) Patent No.: US 10,986,192 B2
(45) Date of Patent: Apr. 20, 2021

(54) INFORMATION PROCESSING METHOD, APPARATUS, AND SYSTEM

(71) Applicant: Siemens Aktiengesellschaft, Munich (DE)

(72) Inventors: Liang Gao, Beijing (CN); Yu Kai Ji, Shanghai (CN); Xing Xing He, Beijing (CN); Peng Sun, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 163 days.

(21) Appl. No.: 16/033,379

(22) Filed: Jul. 12, 2018

(65) Prior Publication Data

US 2019/0104184 A1 Apr. 4, 2019

(30) Foreign Application Priority Data

Sep. 29, 2017 (CN) .......................... 2017 1 0912436

(51) Int. Cl.
*H04L 29/08* (2006.01)
(52) U.S. Cl.
CPC .............. *H04L 67/16* (2013.01); *H04L 67/36* (2013.01); *H04L 67/1031* (2013.01)
(58) Field of Classification Search
CPC ........................................................ H04L 67/36
See application file for complete search history.

(56) References Cited

U.S. PATENT DOCUMENTS 9,648,164 B1 * 5/2017 Harris ................ H04M 3/42068
10,438,140 B2 * 10/2019 Nogami ................ G06Q 10/047

(Continued)

FOREIGN PATENT DOCUMENTS

CN 106227611 A 12/2016
CN 106487594 A 3/2017

(Continued)

OTHER PUBLICATIONS

Kowall Jonah.: "Visualizing and tracking your microservices", May 12, 2015 (May 12, 2015), XP002787926; Retrieved from the Internet: URL:https://blog.appdynamics.com/news/visualizing-and-tracking-your-microservices; 2015.

(Continued)

*Primary Examiner* — Ario Etienne
*Assistant Examiner* — Sm Z Islam
(74) *Attorney, Agent, or Firm* — Harness, Dickey & Pierce, P.L.C.

(57) ABSTRACT

Implementations of embodiments disclose an information processing method, apparatus, and system. In an embodiment, the information processing method includes: monitoring at least one microservice request sent by each of at least two microservices, a microservice request being used by one microservice to call another microservice; determining a call relationship between a first microservice and a second microservice from each detected microservice request, the first microservice being a microservice sending the microservice request, and the second microservice being a microservice that the microservice request requests to call; and generating call information between the at least two microservices based on all determined call relationships. In embodiments of the present invention, call information between microservices can be obtained, the obtained call information is visually displayed to intuitively and conveniently present dependence between the microservices, and a processing capability of a microservice can be adjusted based on an indicator value.

14 Claims, 9 Drawing Sheets

(56) References Cited

U.S. PATENT DOCUMENTS

2018/0270107 A1\* 9/2018 Nassar ................ H04L 41/0686
2018/0352033 A1\* 12/2018 Pacella .................. H04L 67/10

FOREIGN PATENT DOCUMENTS

| CN | 106533805 A | 3/2017 |
| CN | 106789339 A | 5/2017 |
| CN | 107135276 A | 9/2017 |

OTHER PUBLICATIONS

Extended European Search Report dated Jan. 31, 2019.

\* cited by examiner

INFORMATION PROCESSING METHOD, APPARATUS, AND SYSTEM

PRIORITY STATEMENT

The present application hereby claims priority under 35 U.S.C. § 119 to Chinese patent application number CN 201710912436.1 filed Sep. 29, 2017, the entire contents of which are hereby incorporated herein by reference.

FIELD

At least one embodiment of the present invention generally relates to the field of microservice technologies, and in particular, to an information processing method, apparatus, and/or system.

BACKGROUND

Microservice is an architectural pattern in which a single application is divided into a set of small services that coordinate and cooperate with each other to provide ultimate value for users. Each service runs in an independent process of the service. Services communicate with each other by using a lightweight communication mechanism (usually based on an application programming interface (API) conforming to the REpresentational State Transfer (REST) design standard, or referred to as an RESTful API, which is implemented based on the Hyper Text Transfer Protocol (HTTP) protocol).

In the microservice architecture, an application is constructed as a set of loosely coupled services that can be called by each other. However, it is difficult to obtain call information between microservices. In particular, when there are many microservices, how to obtain call information between a plurality of (that is, at least two) microservices is a significant challenge.

SUMMARY

Implementations of the embodiments of the present invention implementation provide an information processing method, apparatus, and system.

An information processing method of at least one embodiment includes:
  monitoring at least one microservice request sent by each of at least two microservices, where a microservice request is used by one microservice to call another microservice;
  determining a call relationship between a first microservice and a second microservice from each detected microservice request, where the first microservice is a microservice sending the microservice request, and the second microservice is a microservice that the microservice request requests to call; and
  generating call information between the at least two microservices based on all determined call relationships.

A data sending method of an embodiment includes:
  obtaining, by using a tracking component in a microservice, metadata of a microservice request sent by the microservice, where metadata of a microservice request is used to determine a call relationship between a first microservice and a second microservice, the first microservice is a microservice sending the microservice request, and the second microservice is a microservice that the microservice request requests to call; and
  sending the metadata by using the tracking component.

An information processing apparatus of an embodiment includes:
  a monitoring module, configured to monitor at least one microservice request sent by each of at least two microservices, where a microservice request is used by one microservice to call another microservice;
  a relationship determining module, configured to determine a call relationship between a first microservice and a second microservice from each detected microservice request, where the first microservice is a microservice sending the microservice request, and the second microservice is a microservice that the microservice request requests to call; and
  a call information generation module, configured to generate call information between the at least two microservices based on all determined call relationships.

A data sending apparatus of an embodiment includes:
  an obtaining module, configured to obtain, by using a tracking component in a microservice, metadata of a microservice request sent by the microservice, where metadata of a microservice request is used to determine a call relationship between a first microservice and a second microservice, the first microservice is a microservice sending the microservice request, and the second microservice is a microservice that the microservice request requests to call; and
  a sending module, configured to send the metadata by using the tracking component.

An information processing apparatus of an embodiment includes:
  at least one memory, configured to store a machine-readable instruction; and
  at least one processor, configured to invoke the machine-readable instruction to perform the method in any implementation above.

An information processing system of an embodiment includes:
  at least two microservices; and
  an information processing apparatus, configured to:
    monitor at least one microservice request sent by each of the at least two microservices, where a microservice request is used by one microservice to call another microservice;
    determine a call relationship between a first micro service and a second microservice from each detected microservice request, where the first microservice is a microservice sending the microservice request, and the second microservice is a microservice that the microservice request requests to call; and
    generate call information between the at least two microservices based on all determined call relationships.

A storage medium stores a computer-readable instruction of an embodiment, where the computer-readable instruction is used to perform the method in any embodiment or implementation above.

Figure 1:
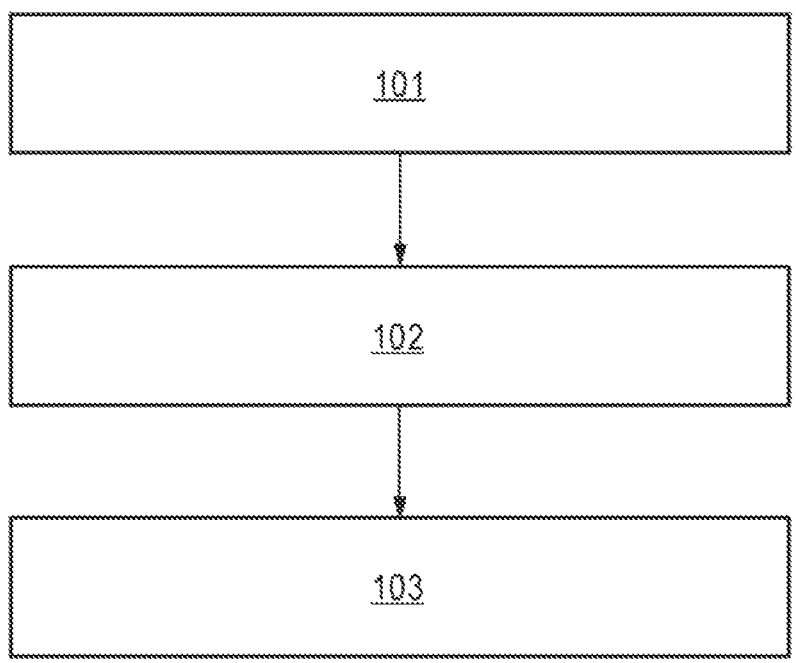
FIG. 1 is a schematic flowchart of an information processing method according to an implementation of an embodiment of the present invention.

Reference numerals are as follows:

| Reference numeral | Meaning |
| --- | --- |
| 101 to 103 | Steps |
| 11 | Host |
| 12 | Image interface |
| 13 | Aggregator |
| 14 | API gateway |
| 15 | Service discovery point |
| 16 | Microservice |
| 17 | Tracking component |
| 18 | RESTful API interface |
| 301 to 307 | Steps |
| 3021 to 3023 | Substeps of step 302 |
| 3061 to 3063 | Substeps of step 306 |
| 3071 to 3073 | Substeps of step 307 |
| 501 to 507 | Steps |
| 5021 to 5023 | Substeps of step 502 |
| 5061 to 5063 | Substeps of step 506 |
| 5071 to 5073 | Substeps of step 507 |
| 41 to 50 | Nodes |
| 60 to 69 | Connection lines |
| 71 | Load balancer |
| 72 | First instance of a microservice C |
| 73 | Second instance of the microservice C |
| 81 | Microservice set provided by a first vendor |
| 82 | Microservice set provided by a second vendor |
| 901 | Monitoring module |
| 902 | Relationship determining module |
| 903 | Call information generation module |
| 904 | Processing capability adjustment module |
| 905 | Display module |
| 906 | List obtaining module |
| 1001 | Obtaining module |
| 1002 | Sending module |

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor;

however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

An information processing method of at least one embodiment includes:
  monitoring at least one microservice request sent by each of at least two microservices, where a microservice request is used by one microservice to call another microservice;
  determining a call relationship between a first microservice and a second microservice from each detected microservice request, where the first microservice is a microservice sending the microservice request, and the second microservice is a microservice that the microservice request requests to call; and generating call information between the at least two microservices based on all determined call relationships.

As can be seen, in this implementation of an embodiment of the present invention, a microservice request is monitored so that a call relationship between a caller of the microservice request and a callee that the microservice request requests to call can be determined, and call information between microservices is generated.

In an implementation of an embodiment, the call information between the at least two microservices includes at least one of the following:

a call relationship between the at least two microservices;

an indirect call path between the at least two microservices; or an indicator value of calling between the at least two microservices.

As can be seen, in this implementation of an embodiment of the present invention, there are a plurality of types of call information, and various requirements of application environments can be satisfied.

In an implementation of an embodiment, the indicator value includes at least one of the following:

times one of the at least two microservices calls another microservice;

a frequency at which one of the at least two microservices calls another microservice;

times one of the at least two microservices successfully calls another microservice;

times one of the at least two microservices unsuccessfully calls another microservice; or a success rate at which one of the at least two microservices calls another microservice; and times one of the at least two microservices is called by all the other microservices;

a frequency at which one of the at least two microservices is called by all the other microservices;

times one of the at least two microservices is successfully called by all the other microservices;

times one of the at least two microservices is unsuccessfully called by all the other microservices; or a success rate at which one of the at least two microservices is called by all the other microservices.

As can be seen, in this implementation of an embodiment of the present invention, there are a plurality of types of indicator values, and a microservice indicator status can be comprehensively learned based on the plurality of types of indicator values.

In an implementation of an embodiment, the indicator value includes: times one of the at least two microservices is called by all the other microservices, a frequency at which one of the at least two microservices is called by all the other microservices, times one of the at least two microservices is successfully called by all the other microservices, times one of the at least two microservices is unsuccessfully called by all the other microservices, or a success rate at which one of the at least two microservices is called by all the other microservices; and the method further includes:

when an indicator value of a called microservice exceeds a first preset threshold, increasing a processing capability of the called microservice, and/or when the indicator value of the called microservice is lower than a second preset threshold, decreasing or maintaining the processing capability of the called microservice, where the first preset threshold is not less than the second preset threshold.

As can be seen, in this implementation of an embodiment of the present invention, a processing capability of a microservice is adjusted based on a preset threshold of an indicator value, so that the processing capability of the microservice satisfies a specific requirement of an application environment.

In an implementation of an embodiment, after the generating call information between the at least two microservices based on all determined call relationships, the method further includes:

displaying the generated call information by using at least one visual interface.

As can be seen, the generated call information is displayed on the visual interface, so that the call information between the microservices can be intuitively and conveniently presented, to help a user to quickly, intuitively, and accurately learn the call information between the microservices.

In an implementation of an embodiment, the call information between the at least two microservices includes the call relationship between the at least two microservices; and the displaying the generated call information by using at least one visual interface includes:

displaying, on the visual interface, a topology view of the call relationship between the at least two microservices, where nodes in the topology view are used to represent the at least two microservices, a connection line between two adjacent nodes in the topology view is used to indicate a call relationship in which a third microservice calls a fourth microservice, the third microservice is a microservice represented by a start node of the connection line, and the fourth microservice is a microservice represented by an end node of the connection line.

Therefore, the topology view of the call relationship between the microservices is displayed on the visual interface, so that a call relationship between a microservice (that is, a start node) sending a microservice request and a microservice (that is, an end node) that the microservice request requests to call can be intuitively and conveniently presented.

In an implementation of an embodiment, the call information between the at least two microservices further includes the indirect call path between the at least two microservices; and the displaying the generated call information by using at least one visual interface further includes:

displaying, on the visual interface, a path from one node to another node in the topology view, where a path is used to indicate microservices called in sequence and a call order when a fifth microservice calls a sixth microservice, the fifth microservice is a microservice represented by a start node of the path, and the sixth microservice is a microservice represented by an end node of the path.

Therefore, the topology view of the indirect call path between the microservices is displayed on the visual interface, so that a call relationship between a microservice (that is, a start node) sending a microservice request, a microservice (that is, an end node) that the microservice request requests to call, and an intermediate node between the start node and the end node can be intuitively and conveniently presented.

In an implementation of an embodiment, the call information between the at least two microservices further includes
the indicator value of calling between the at least two microservices; and
the displaying the generated call information by using at least one visual interface further includes:
representing at least one of the following by using a thickness of a connection line: times one of the at least two microservices calls another microservice;
a frequency at which one of the at least two microservices calls another microservice;
times one of the at least two microservices successfully calls another micro service;
times one of the at least two microservices unsuccessfully calls another microservice; or
a success rate at which one of the at least two microservices calls another microservice; and
representing at least one of the following by using a size of a node:
times one of the at least two microservices is called by all the other microservices;
a frequency at which one of the at least two microservices is called by all the other microservices;
times one of the at least two microservices is successfully called by all the other microservices;
times one of the at least two microservices is unsuccessfully called by all the other microservices; or
a success rate at which one of the at least two microservices is called by all the other microservices.

Herein, in this implementation of an embodiment of the present invention, the indicator value is displayed by using a visual factor such a thickness of a line or a size of a node, to help a user to quickly learn the indicator value.

In an implementation of an embodiment, the monitoring at least one microservice request sent by each of at least two microservices includes:
obtaining, from a tracking component in each of at least two microservices, metadata of all microservice requests sent by the microservice in which the tracking component is located.

Herein, metadata of all microservice requests sent by a microservice is obtained by using a tracking component deployed in the microservice, so that the metadata of the microservice requests can be quickly obtained without interaction with outside of the microservice, thereby achieving a convenient metadata obtaining manner.

In an implementation of an embodiment, before the monitoring at least one microservice request sent by each of at least two microservices, the method further includes:
obtaining a list of the at least two microservices from a service discovery point, where the service discovery point is configured to register microservices; and
the obtaining, from a tracking component in each of at least two microservices, metadata of all microservice requests sent by the microservice in which the tracking component is located includes: obtaining, from the tracking component in each microservice recorded in the list of the at least two microservices, metadata of all microservice requests sent by the microservice in which the tracking component is located.

Herein, a list is obtained from a service discovery point for microservice registration, and then metadata of microservices recorded in the list is obtained, thereby ensuring that all obtained metadata is from registered microservices, and improving management efficiency and information security.

In an implementation of an embodiment, metadata of a microservice request includes at least one of the following:
a name of a microservice that the microservice request requests to call;
an interface of the microservice that the microservice request requests to call; or
an identifier of the micro service that the microservice request requests to call.

As can be seen, depending on specific application requirements, metadata in this implementation of the present invention may have a plurality of implementation forms.

A data sending method of an embodiment includes:
obtaining, by using a tracking component in a microservice, metadata of a microservice request sent by the microservice, where metadata of a microservice request is used to determine a call relationship between a first microservice and a second microservice, the first microservice is a microservice sending the microservice request, and the second microservice is a microservice that the microservice request requests to call; and
sending the metadata by using the tracking component.

As can be seen, this implementation of an embodiment of the present invention further provides a method for sending metadata of a microservice. Metadata is obtained and sent by using a tracking component deployed in a microservice, which has simple implementation and high operability.

In an implementation of an embodiment, the metadata of the microservice request includes at least one of the following:
a name of a microservice that the microservice request requests to call;
an interface of the microservice that the microservice request requests to call; or
an identifier of the micro service that the microservice request requests to call.

An information processing apparatus of an embodiment includes:
a monitoring module, configured to monitor at least one microservice request sent by each of at least two microservices, where a microservice request is used by one microservice to call another microservice;
a relationship determining module, configured to determine a call relationship between a first microservice and a second microservice from each detected microservice request, where the first microservice is a microservice sending the microservice request, and the second microservice is a microservice that the microservice request requests to call; and
a call information generation module, configured to generate call information between the at least two microservices based on all determined call relationships.

As can be seen, in this implementation of an embodiment of the present invention, a microservice request is monitored so that a call relationship between a caller of the microservice request and a callee that the microservice request requests to call can be determined, and call information between microservices is generated.

In an implementation of an embodiment, the call information between the at least two microservices includes at least one of the following:
a call relationship between the at least two microservices;
an indirect call path between the at least two microservices; or
an indicator value of calling between the at least two microservices.

As can be seen, in this implementation of an embodiment of the present invention, there are a plurality of types of call information, and various requirements of application environments can be satisfied.

In an implementation of an embodiment, the indicator value includes at least one of the following:
- times one of the at least two microservices calls another microservice;
- a frequency at which one of the at least two microservices calls another microservice;
- times one of the at least two microservices successfully calls another microservice;
- times one of the at least two microservices unsuccessfully calls another microservice; or
- a success rate at which one of the at least two microservices calls another microservice; and
- times one of the at least two microservices is called by all the other microservices;
- a frequency at which one of the at least two microservices is called by all the other microservices;
- times one of the at least two microservices is successfully called by all the other microservices;
- times one of the at least two microservices is unsuccessfully called by all the other microservices; or
- a success rate at which one of the at least two microservices is called by all the other microservices.

As can be seen, in this implementation of an embodiment of the present invention, there are a plurality of types of indicator values, and a microservice indicator status can be comprehensively learned based on the plurality of types of indicator values.

In an implementation of an embodiment, the indicator value includes: times one of the at least two microservices is called by all the other microservices, a frequency at which one of the at least two microservices is called by all the other microservices, times one of the at least two microservices is successfully called by all the other microservices, times one of the at least two microservices is unsuccessfully called by all the other microservices, or a success rate at which one of the at least two microservices is called by all the other microservices; and
the apparatus further includes:
- a processing capability adjustment module, configured to: when an indicator value of a called microservice exceeds a first preset threshold, increase a processing capability of the called microservice, and/or
- when the indicator value of the called microservice is lower than a second preset threshold, decrease or maintain the processing capability of the called microservice, where the first preset threshold is not less than the second preset threshold.

As can be seen, in this implementation of an embodiment of the present invention, a processing capability of a microservice is adjusted based on a preset threshold of an indicator value, so that the processing capability of the microservice satisfies a specific requirement of an application environment.

In an implementation of an embodiment, the apparatus further includes:
- a display module, configured to: after the call information generation module generates the call information between the at least two microservices based on all the determined call relationships, display the generated call information by using at least one visual interface.

As can be seen, the generated call information is displayed on the visual interface, so that the call information between the microservices can be intuitively and conveniently presented, to help a user to quickly, intuitively, and accurately learn the call information between the microservices.

In an implementation of an embodiment, the call information between the at least two microservices includes the call relationship between the at least two microservices; and
the display module is configured to display, on the visual interface, a topology view of the call relationship between the at least two microservices, where nodes in the topology view are used to represent the at least two microservices, a connection line between two adjacent nodes in the topology view is used to indicate a call relationship in which a third microservice calls a fourth microservice, the third microservice is a microservice represented by a start node of the connection line, and the fourth microservice is a microservice represented by an end node of the connection line.

Therefore, the topology view of the call relationship between the microservices is displayed on the visual interface, so that a call relationship between a microservice (that is, a start node) sending a microservice request and a microservice (that is, an end node) that the microservice request requests to call can be intuitively and conveniently presented.

In an implementation of an embodiment, the call information between the at least two microservices further includes the indirect call path between the at least two microservices; and
the display module is configured to display, on the visual interface, a path from one node to another node in the topology view, where a path is used to indicate microservices called in sequence and a call order when a fifth microservice calls a sixth microservice, the fifth microservice is a microservice represented by a start node of the path, and the sixth microservice is a microservice represented by an end node of the path.

Therefore, the topology view of the indirect call path between the microservices is displayed on the visual interface, so that a call relationship between a microservice (that is, a start node) sending a microservice request, a microservice (that is, an end node) that the microservice request requests to call, and an intermediate node between the start node and the end node can be intuitively and conveniently presented.

In an implementation of an embodiment, the call information between the at least two microservices further includes the indicator value of calling between the at least two microservices; and
the display module is configured to:
represent at least one of the following by using a thickness of a connection line:
- times one of the at least two microservices calls another microservice;
- a frequency at which one of the at least two microservices calls another microservice;
- times one of the at least two microservices successfully calls another microservice;
- times one of the at least two microservices unsuccessfully calls another microservice; or
- a success rate at which one of the at least two microservices calls another microservice; and
represent at least one of the following by using a size of a node:
- times one of the at least two microservices is called by all the other microservices;
- a frequency at which one of the at least two microservices is called by all the other microservices;

times one of the at least two microservices is successfully called by all the other microservices;

times one of the at least two microservices is unsuccessfully called by all the other microservices; or a success rate at which one of the at least two microservices is called by all the other microservices.

Herein, in this implementation of an embodiment of the present invention, the indicator value is displayed by using a visual factor such a thickness of a line or a size of a node, to help a user to quickly learn the indicator value.

In an implementation of an embodiment, the monitoring module is configured to obtain, from a tracking component in each of at least two microservices, metadata of all microservice requests sent by the microservice in which the tracking component is located.

Herein, metadata of all microservice requests sent by a microservice is obtained by using a tracking component deployed in the microservice, so that the metadata of the microservice requests can be quickly obtained without interaction with outside of the microservice, thereby achieving a convenient metadata obtaining manner.

In an implementation of an embodiment, the apparatus further includes:

a list obtaining module, configured to: before the monitoring module monitors the at least one microservice request sent by each of at least two microservices, obtain a list of the at least two microservices from a service discovery point, where the service discovery point is configured to register microservices; and the monitoring module is configured to obtain, from the tracking component in each microservice recorded in the list of the at least two microservices, metadata of all microservice requests sent by the microservice in which the tracking component is located.

Herein, a list is obtained from a service discovery point for microservice registration, and then metadata of microservices recorded in the list is obtained, thereby ensuring that all obtained metadata is from registered microservices, and improving management efficiency and information security.

A data sending apparatus of an embodiment includes:

an obtaining module, configured to obtain, by using a tracking component in a microservice, metadata of a microservice request sent by the microservice, where metadata of a microservice request is used to determine a call relationship between a first microservice and a second microservice, the first microservice is a microservice sending the microservice request, and the second microservice is a microservice that the microservice request requests to call; and a sending module, configured to send the metadata by using the tracking component.

As can be seen, this implementation of an embodiment of the present invention further provides an apparatus for sending metadata of a microservice. Metadata is obtained and sent by using a tracking component deployed in a microservice, which has simple implementation and high operability.

An information processing apparatus of an embodiment includes:

at least one memory, configured to store a machine-readable instruction; and at least one processor, configured to invoke the machine-readable instruction to perform the method in any implementation above.

An implementation of an embodiment of the present invention further provides an information processing apparatus including a memory and a processor, where the processor can quickly perform the method in any implementation above by invoking a machine-readable instruction stored in the memory.

An information processing system of an embodiment includes:

at least two microservices; and an information processing apparatus, configured to:

monitor at least one microservice request sent by each of the at least two microservices, where a microservice request is used by one microservice to call another microservice;

determine a call relationship between a first micro service and a second microservice from each detected microservice request, where the first microservice is a microservice sending the microservice request, and the second microservice is a microservice that the microservice request requests to call; and generate call information between the at least two microservices based on all determined call relationships.

In an implementation of an embodiment, the system further includes:

a service discovery point, configured to register microservices, generate a microservice list including the registered microservices, and send the microservice list to the information processing apparatus.

As can be seen, the service discovery point registers microservices and generates a microservice list including the registered microservices, thereby ensuring that all metadata obtained by the information processing apparatus is from registered microservices, and improving management efficiency and information security.

A storage medium stores a computer-readable instruction of an embodiment, where the computer-readable instruction is used to perform the method in any embodiment or implementation above.

To make the technical solutions and advantages of the present invention clearer and more comprehensible, the following further describes the present invention in detail with reference to the accompanying drawings and implementations. It should be understood that the described specific implementations are only used to illustrate the present invention rather than to limit protection scope of the present invention.

For the purpose of brief and intuitive description, the following describes solutions of the present invention by describing several representative implementation manners. A large number of details in the implementation manners are only used to help understand the solutions of the present invention. However, obviously, implementation of the technical solutions of the present invention is limited to these details. To avoid making the solutions of the present invention disclosure obscure, some implementation manners are not described in detail, but only a framework is given. In the following descriptions, "include" refers to "include but not limited to", and "based on . . . " refers to "at least based on . . . , but not limited to based on . . . ". Due to the language convention of Chinese, when the number of elements is not specified in the following descriptions, it means that there may be one or more elements, or it may be understood that there is at least one element.

In the implementations of the present invention, call information between at least two microservices can be obtained by monitoring a microservice request sent by each microservice (for example, obtaining metadata of the microservice request). In addition, dependence between the microservices can ne intuitively and conveniently presented by visually displaying the obtained call information.

FIG. 1 is a schematic flowchart of an information processing method according to an implementation of an embodiment of the present invention.

As shown in FIG. 1, the method includes the following steps:

Step 101: Monitor at least one microservice request sent by each of at least two microservices, where a microservice request is used by one microservice to call another microservice.

Herein, a tracking component may be created in each microservice, and the tracking component is configured to record metadata of all microservice requests sent by the corresponding microservice. Preferably, metadata of a microservice request includes at least one of the following: a name of a microservice that the microservice request requests to call; an interface of the microservice that the microservice request requests to call; an identifier of the microservice that the microservice request requests to call, etc.

After obtaining the metadata of all the microservice requests sent by the microservice in which the tracking component is located, the tracking component records the metadata, and periodically or non-periodically sends the recorded metadata to a monitoring party by using a predetermined interface. In an implementation, before the monitoring at least one microservice request sent by each of at least two microservices, the method further includes: registering all microservices with a service discovery point, and generating a microservice list including the registered microservices at the service discovery point; and obtaining the microservice list from the service discovery point. In this case, tracking component sends, by using the predetermined interface, metadata of all microservice requests sent by the registered microservices in the microservice list.

Preferably, the predetermined interface may be implemented by using a RESTful API interface. Those skilled in the art may be aware that, the predetermined interface may alternatively be implemented by using another interface based on the HTTP protocol. No limitation is set thereto in this implementation of the present invention.

Step 102: Determine a call relationship between a first microservice and a second microservice from each detected microservice request, where the first microservice is a microservice sending the microservice request, and the second microservice is a microservice that the microservice request requests to call.

Herein, the monitoring party may parse metadata of each microservice request, to determine a caller and a callee of each microservice request. For example, the monitoring party determines, by parsing metadata of a microservice request, a name of a microservice that the microservice request requests to call or an identifier of the microservice that the microservice request requests to call, thereby determining a callee of the microservice request. In addition, the monitoring party may determine a caller of the microservice request by obtaining a source of the microservice request. The first microservice is a caller of the microservice request, and the second microservice is a callee that the microservice request requests to call. As can be seen, the first microservice and the second microservice herein do not particularly refer to some fixed microservices, but generally refer to a caller of a microservice request and a callee that the microservice request requests to call.

Step 103: Generate call information between the at least two microservices based on all determined call relationships.

In an implementation of an embodiment, the call information between the microservices includes at least one of the following: a call relationship between the microservices; an indirect call path between the microservices; an indicator value of calling between the microservices, etc.

Specifically, a call relationship between microservices indicates a caller and a callee of a microservice request. For example, a microservice A sends a microservice request C for calling a microservice B. Then based on the microservice request C, it may be determined that a call relationship between the microservice A and the microservice B is: the microservice A calls the microservice B, that is, microservice A→microservice B.

An indirect call path between microservices indicates a caller of a microservice request, a callee of the microservice request, and a callee that is called by the callee as a caller of another microservice request. For example, a microservice A sends a microservice request C for calling a microservice B, and the microservice B sends a microservice request E for calling a microservice D. Then based on the microservice request C and the microservice request E, it may be determined that an indirect call path between the microservice A and the microservice D is: the microservice A calls the microservice B, and the microservice B calls the microservice D, that is, microservice A→microservice B→microservice D.

An indicator value of calling between microservices may measure a call value between the microservices in a quantized manner. Any subsequent operation may be performed based on the indicator value. Exemplarily, the subsequent operation includes: adjusting a processing capability of a microservice, graphically displaying the indicator value, etc.

For example, the indicator value may include at least one of the following: times one microservice calls another microservice; a frequency at which one microservice calls another microservice; times one microservice successfully calls another microservice; times one microservice unsuccessfully calls another microservice; a success rate at which one microservice calls another microservice; times one microservice is called by all the other microservices; a frequency at which one microservice is called by all the other microservices; times one microservice is successfully called by all the other microservices; times one microservice is unsuccessfully called by all the other microservices; a success rate at which one microservice is called by all the other microservices, etc.

The "times one microservice is called by all the other microservices" in the indicator value is explicitly explained as follows: The "all" herein does not mean that one microservice must be called by all the other microservices, but instead, when times the microservice is called is counted, all the other microservices in the at least two microservices other than the microservice is considered, that is, any other microservice calling the microservice is counted.

The "frequency at which one microservice is called by all the other microservices" in the indicator value is explicitly explained as follows: The "all" herein does not mean that one microservice must be called by all the other microservices, but instead, when a frequency at which the microservice is called is counted, all the other microservices in the at least two microservices other than the microservice is considered, that is, any other microservice calling the microservice is counted.

The "times one microservice is successfully called by all the other microservices" in the indicator value is explicitly explained as follows: The "all" herein does not mean that one microservice must be called by all the other microservices, but instead, when times the microservice is successfully called is counted, all the other microservices in the at least two microservices other than the microservice is considered, that is, any other microservice successfully calling the microservice is counted.

The "times one microservice is unsuccessfully called by all the other microservices" in the indicator value is explicitly explained as follows: The "all" herein does not mean that one microservice must be called by all the other microservices, but instead, when times the microservice is unsuccessfully called is counted, all the other microservices in the at least two microservices other than the microservice is considered, that is, any other microservice unsuccessfully calling the microservice is counted.

The "success rate at which one microservice is called by all the other microservices" in the indicator value is explicitly explained as follows: The "all" herein does not mean that one microservice must be called by all the other microservices, but instead, when a success rate at which the microservice is called is counted, all the other microservices in the at least two microservices other than the microservice is considered, that is, any other microservice successfully calling the microservice is counted.

Specific examples of the indicator value of calling between the microservices are exemplarily described above. Those skilled in the art may be aware that the description is merely exemplary and is not intended to limit the protection scope of the implementations of the present invention.

In an implementation of an embodiment, the indicator value includes: times one of the at least two microservices is called by all the other microservices, a frequency at which one of the at least two microservices is called by all the other microservices, times one of the at least two microservices is successfully called by all the other microservices, times one of the at least two microservices is unsuccessfully called by all the other microservices, or a success rate at which one of the at least two microservices is called by all the other microservices. In this case, the method further includes: when an indicator value of a called micro service exceeds a first preset threshold, increasing a processing capability of the called microservice, and/or when the indicator value of the called microservice is lower than a second preset threshold, decreasing or maintaining the processing capability of the called microservice, where the first preset threshold is not less than the second preset threshold.

Herein, the first preset threshold is used to determine whether a processing capability of a microservice needs to be increased, and the second preset threshold is used to determine whether a processing capability of a microservice needs to be decreased or maintained.

It is assumed that an indicator value is times one microservice is called by all the other microservices; the first preset threshold is 500; and the second preset threshold is 200.

For example, when times a microservice (for example, a microservice A) is called by all the other microservices is 600, because the times (600) is greater than the first preset threshold (500), it is considered that a processing capability of the microservice A is insufficient, and therefore the processing capability of the microservice A is increased.

For another example, when times a microservice (for example, a microservice B) is called by all the other microservices is 100, because the times (100) is less than the second preset threshold (200), it is considered that a processing capability of the microservice B is sufficient, and therefore the processing capability of the microservice B is decreased or maintained.

A process of adjusting a processing capability of a microservice is exemplarily described above by using an example in which times one microservice is called by all the other microservices is used as an indicator value. Those skilled in the art may be aware that the description is merely exemplary and is not intended to limit the protection scope of the implementations of the present invention.

Based on the foregoing description, the call information between at least two microservices may be generated. Preferably, the method further includes: displaying the generated call information by using at least one visual interface. The visual interface may be implemented by using a display interface provided by any electronic element having a display function, such as a computer screen, a mobile terminal display, or an electronic apparatus display.

In an implementation of an embodiment, the call information between the at least two microservices includes the call relationship between the at least two microservices; and the displaying the generated call information by using at least one visual interface includes: displaying, on the visual interface, a topology view of the call relationship between the at least two microservices, where nodes in the topology view are used to represent the at least two microservices, a connection line between two adjacent nodes in the topology view is used to indicate a call relationship in which a third microservice calls a fourth microservice, the third microservice is a microservice represented by a start node of the connection line, and the fourth microservice is a microservice represented by an end node of the connection line. The third microservice and the fourth microservice herein do not particularly refer to some fixed microservices, but generally refer to a start node and an end node in a connection line including two adjacent nodes.

In an implementation of an embodiment, the call information between the at least two microservices includes the indirect call path between the at least two microservices; and the displaying the generated call information by using at least one visual interface further includes: displaying, on the visual interface, a path from one node to another node in the topology view, where a path is used to indicate microservices called in sequence and a call order when a fifth microservice calls a sixth microservice, the fifth microservice is a microservice represented by a start node of the path, and the sixth microservice is a microservice represented by an end node of the path. The fifth microservice and the sixth microservice herein do not particularly refer to some fixed microservices, but generally refer to a start node and an end node in a path including at least three nodes.

In an implementation of an embodiment, the call information between the at least two microservices includes the indicator value of calling between the at least two microservices; and the displaying the generated call information by using at least one visual interface further includes: representing at least one of the following by using a thickness of a connection line: times one microservice calls another microservice; a frequency at which one microservice calls another microservice; times one microservice successfully calls another microservice; times one microservice unsuccessfully calls another microservice; or a success rate at which one microservice calls another microservice; and/or representing at least one of the following by using a size of a node: times one microservice is called by all the other microservices; a frequency at which one microservice is called by all the other microservices; times one microservice is successfully called by all the other microservices; times one microservice is unsuccessfully called by all the other microservices; a success rate at which one microservice is called by all the other microservices, etc.

As can be seen, an indicator value of calling between microservices is intuitively represented by using a thickness of a connection line or a size of a node, so that a user can directly and accurately learn a specific calling status between the microservices.

Manners of displaying generated call information by using a visual interface are exemplarily described above. Those skilled in the art may be aware that the description is merely exemplary and is not intended to limit the protection scope of the implementations of the present invention.

The implementations of embodiments of the present invention are described more specifically based on a specific microservice system architecture.

Figure 2:
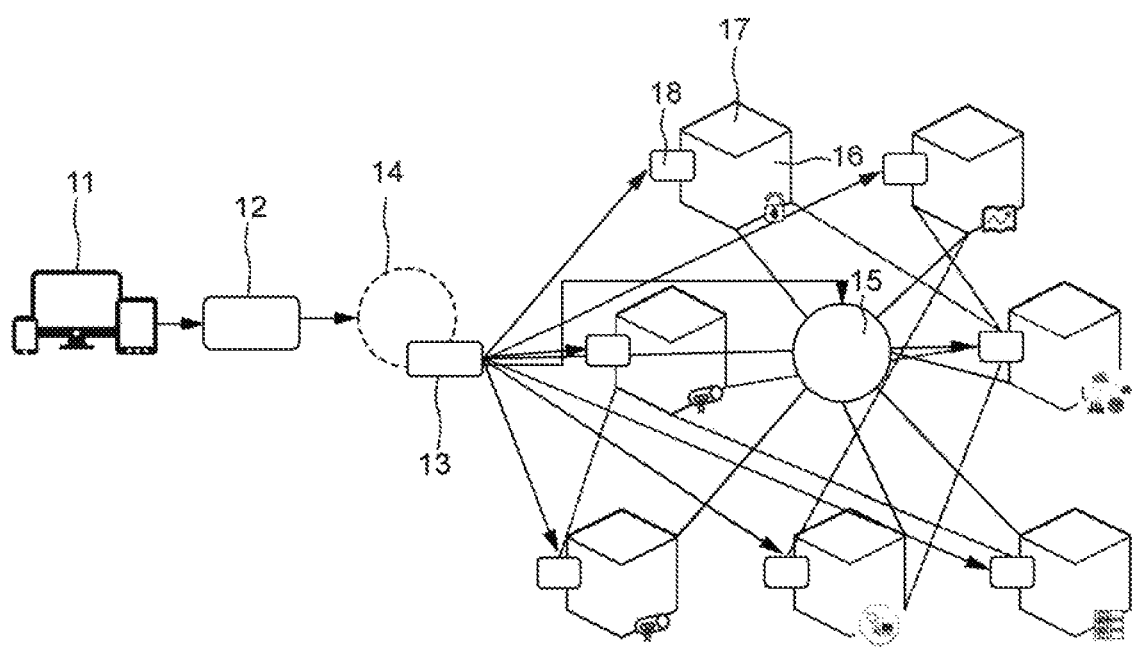
FIG. 2 is a schematic architectural diagram of an information processing system according to an implementation of an embodiment of the present invention.

FIG. 2 is a schematic architectural diagram of an information processing system according to an implementation of an embodiment of the present invention.

As shown in FIG. 2, the system includes a host 11, an image interface 12 provided by the host 11, an aggregator 13, a service discovery point 15, and a plurality of microservices 16. Each microservice 16 is provided with a tracking component 17. The tracking component 17 is configured to record metadata of all microservice requests sent by the corresponding microservice. Each tracking component 17 may be connected to the aggregator 13 by using a RESTful API interface 18. The system may further include an API gateway 14. The aggregator 13 may be disposed in the API gateway 14. A specific manner of mutual positioning between an application and a microservice in a network is defined in the service discovery point 15. The service discovery point 15 may include one or more servers for maintaining a global address and a client connected to the server to update and parse the address.

Figure 3:
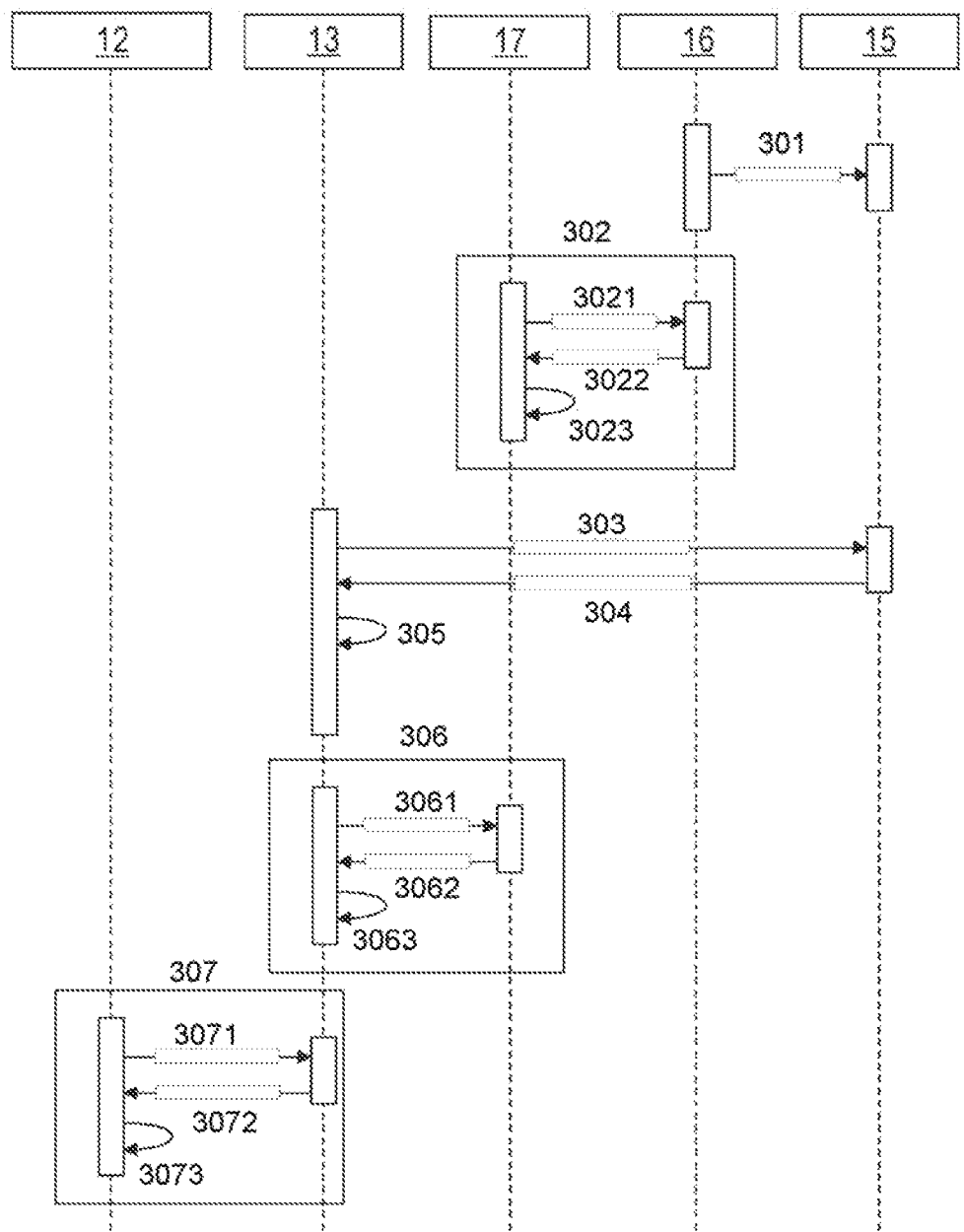
FIG. 3 is a first schematic flowchart of obtaining and displaying call information according to an implementation of an embodiment of the present invention.

Based on the system architecture shown in FIG. 2, FIG. 3 is a first schematic flowchart of obtaining and displaying call information according to an implementation of the present invention.

As shown in FIG. 3, the method includes the following steps:

Step 301: Each microservice 16 sends a registration request for registering the microservice to the service discovery point 15.

Step 302: The tracking component 17 of each microservice 16 cyclically obtains metadata of all microservice requests sent by the corresponding microservice 16. Step 302 specifically includes: Substep 3021: The tracking component 17 of each microservice 16 sends a tracking request to the corresponding microservice 16. Substep 3022: The corresponding microservice 16 returns, to the tracking component 17, the metadata of all the microservice requests sent by the corresponding microservice 16. Substep 3023: The tracking component 17 of each microservice 16 stores the metadata returned by the corresponding microservice 16.

Step 303: The aggregator 13 sends a request for obtaining all registered microservices to the service discovery point 15.

Step 304: The service discovery point 15 provides a microservice list including all the registered microservices to the aggregator 13.

Step 305: The aggregator 13 stores the microservice list.

Step 306: The aggregator 13 obtains the metadata from the tracking component 17 of each microservice 16, and determines, based on the obtained metadata, call information between all the registered microservices in the microservice list. Step 306 specifically includes: Substep 3061: The aggregator 13 sends an aggregation request to the tracking component 17 of each microservice 16. Substep 3062: The tracking component 17 of each microservice 16 sends the metadata stored in the tracking component 17 to the aggregator 13. Substep 3063: The aggregator 13 parses metadata of each microservice request to determine the call information between all the registered microservices, where the call information includes a call relationship between the microservices.

Step 307: The image interface 12 cyclically obtains the call information, and displays the call information by using a visual interface. Step 307 specifically includes: Substep 3071: The image interface 12 sends, to the aggregator 13, a request for obtaining the call information between all the microservices. Substep 3072: The aggregator 13 sends the call information between all the microservices to the image interface 12. Substep 3073: The image interface 12 draws and displays a topology view based on the call information between all the microservices.

As can be seen, the aggregator 13 functions to aggregate microservice requests sent by all the microservices, and generate the call information between the microservices based on the aggregated microservice requests. The aggregator 13 specifically implements the information processing method shown in FIG. 1. The aggregator 13 may be implemented by using one or more computer programs, and configured in one or more computing devices, which is not limited in this implementation of the present invention.

Figure 4:
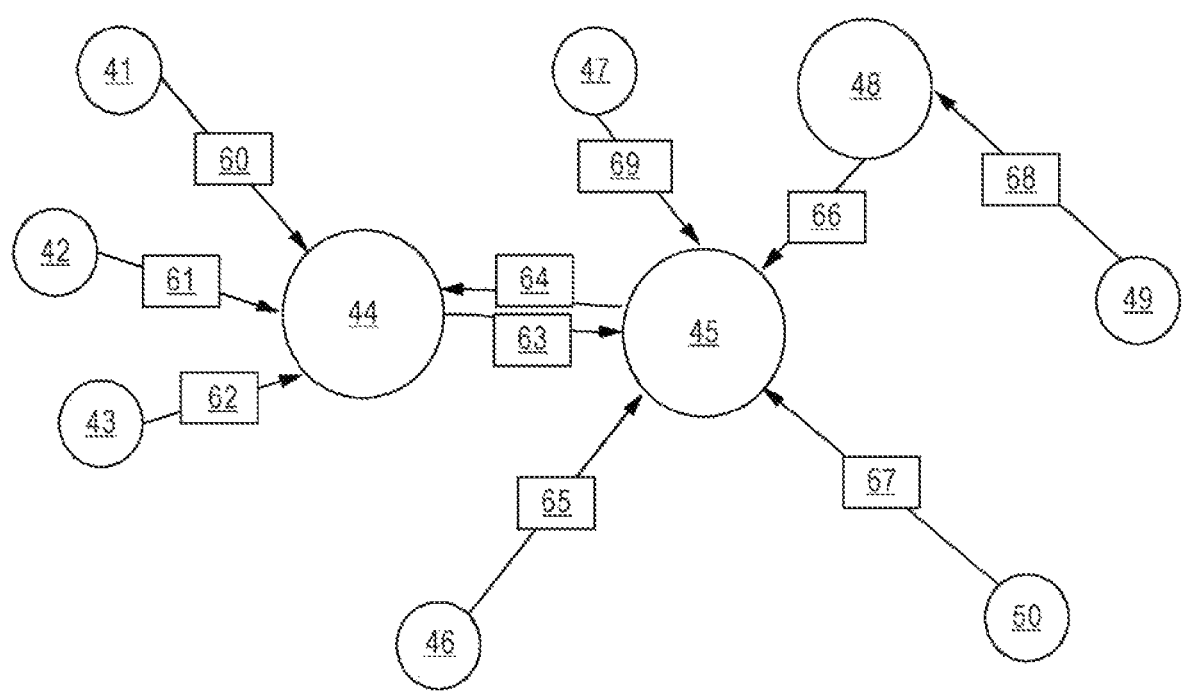
FIG. 4 is a first schematic topology view of displaying call information according to an implementation of an embodiment of the present invention.

FIG. 4 is a first schematic topology view of displaying call information according to an implementation of an embodiment of the present invention.

In FIG. 4, a node represented by a circle represents a microservice, and a connection line between two adjacent nodes indicates a call relationship between the two adjacent nodes. FIG. 4 includes 10 nodes and 10 connection lines: a node 41 to a node 50, and a connection line 60 to a connection line 69. An arrow of a connection line points to a called node, and is opposite to a calling node.

For example, the connection line 60 between the node 41 and a node 44 indicates that the node 41 calls the node 44; a connection line 61 between a node 42 and a node 44 indicates that the node 42 calls the node 44.

In addition, the topology view may further include a path having at least three nodes. The path indicates an indirect call relationship from a start point of the path, to an intermediate point (there may be one or more intermediate points) of the path, and then to an end point of the path. For example, a path between the node 42 and a node 45 includes the connection line 61 between the node 42 and the node 44 and a connection line 63 between the node 44 and the node 45, which means that the node 42 calls the node 44, and the node 44 then calls the node 45, so that the node 42 indirectly calls the node 45.

Figure 5:
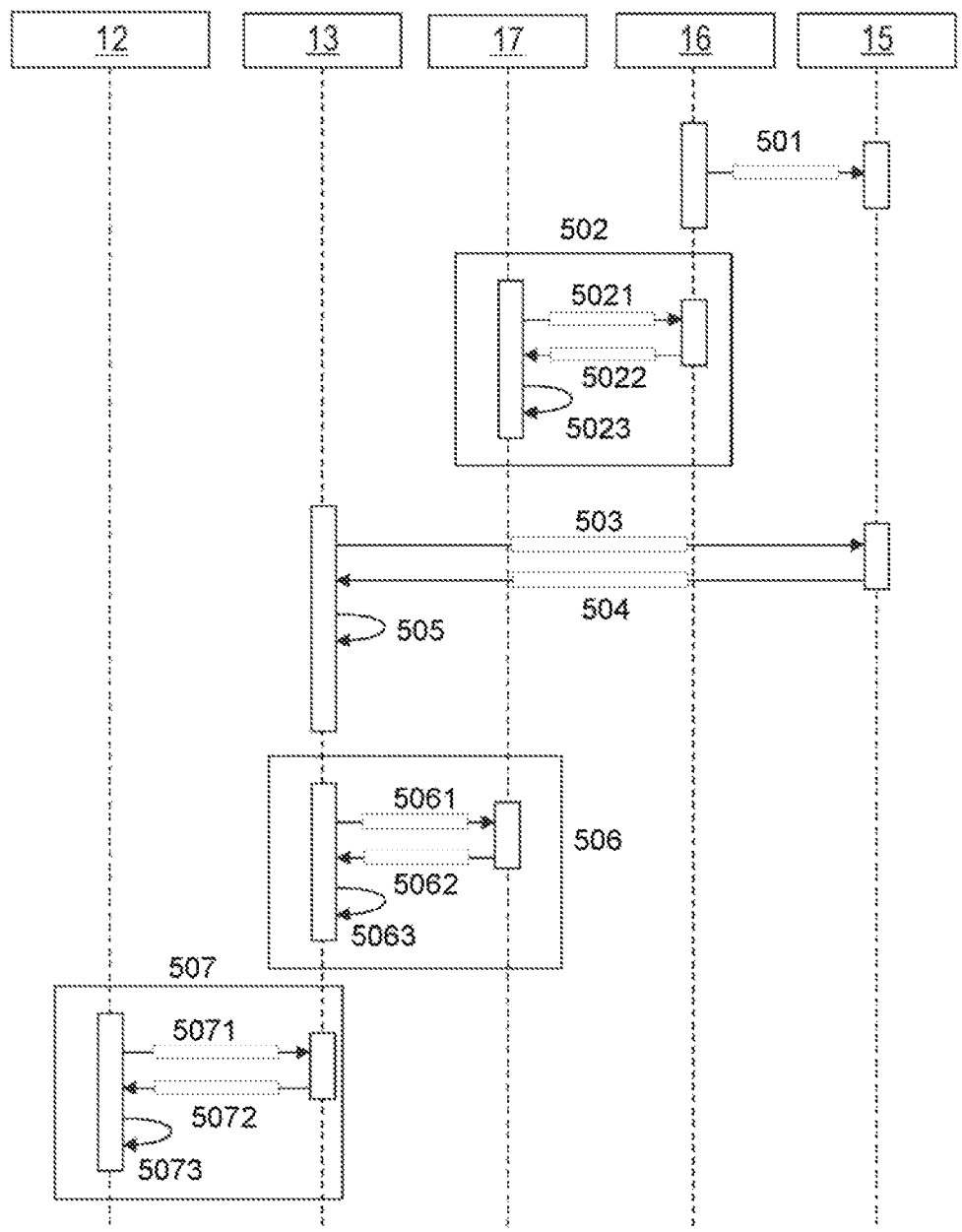
FIG. 5 is a second schematic flowchart of obtaining and displaying call information including an indicator value according to an implementation of an embodiment of the present invention.

Based on the system architecture shown in FIG. 2, FIG. 5 is a second schematic flowchart of obtaining and displaying call information including an indicator value according to an implementation of an embodiment of the present invention.

As shown in FIG. 5, the method includes the following steps:

Step 501: Each microservice 16 sends, to the service discovery point 15, a registration request for registering the microservice.

Step 502: The tracking component 17 of each microservice 16 cyclically obtains metadata of all microservice requests sent by the corresponding microservice 16. Step 502 specifically includes: Substep 5021: The tracking component 17 of each microservice 16 sends a tracking request to the corresponding microservice 16. Substep 5022: The corresponding microservice 16 returns, to the tracking component 17, the metadata of all the microservice requests sent by the corresponding microservice 16. Substep 5023: The tracking component 17 of each microservice 16 stores the metadata returned by the corresponding microservice 16.

Step 503: The aggregator 13 sends a request for obtaining all registered microservices to the service discovery point 15.

Step 504: The service discovery point 15 provides a microservice list including all the registered microservices to the aggregator 13.

Step 505: The aggregator 13 stores the microservice list.

Step 506: The aggregator 13 obtains the metadata from the tracking component 17 of each microservice 16, and determines, based on the obtained metadata, call information between all the registered microservices in the microservice list and an indicator value of calling between the microservices. Step 506 specifically includes: Substep 5061: The aggregator 13 sends an aggregation request to the tracking component 17 of each microservice 16. Substep 5062: The tracking component 17 of each microservice 16 sends the metadata stored in the tracking component 17 to the aggregator 13. Substep 5063: The aggregator 13 parses metadata of each microservice request to determine the call information between all the registered microservices, where the call information includes a call relationship between the microservices and the indicator value of calling between the microservices.

Step 507: The image interface 12 cyclically obtains the call information, and displays the call information by using a visual interface. Step 507 specifically includes: Substep 5071: The image interface 12 sends, to the aggregator 13, a request for obtaining the call information between all the microservices. Substep 5072: The aggregator 13 sends the call information between all the microservices to the image interface 12. Substep 5073: The image interface 12 draws and displays a topology view based on the call information between all the microservices.

Figure 6:
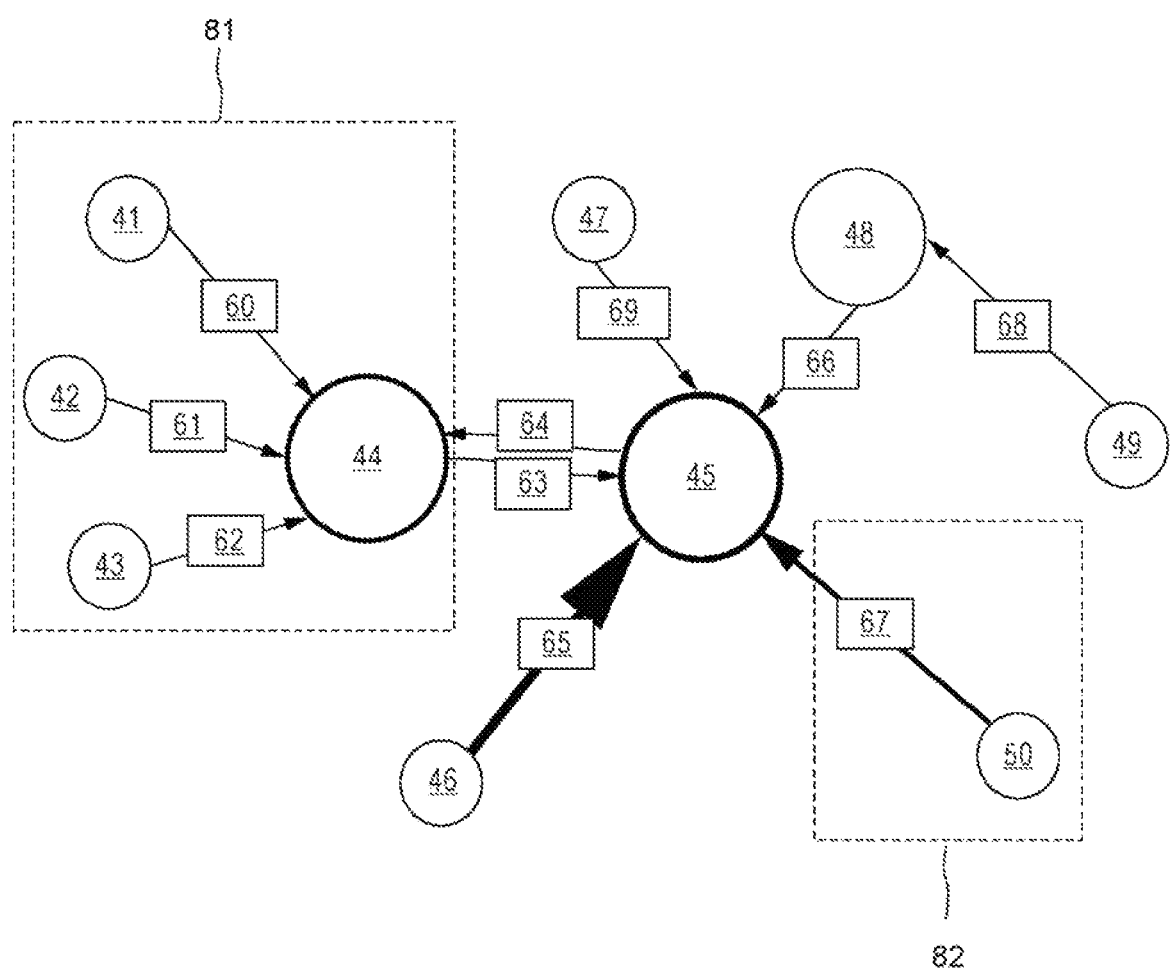
FIG. 6 is a second schematic topology view of displaying call information including an indicator value according to an implementation of an embodiment of the present invention.

FIG. 6 is a second schematic topology view of displaying call information including an indicator value according to an implementation of an embodiment of the present invention.

In FIG. 6, a node represented by a circle represents a microservice, and a connection line between two adjacent nodes indicates a call relationship between the two adjacent nodes. FIG. 6 includes 10 nodes and 10 connection lines. The 10 nodes are a node 41 to a node 50, and the 10 connection lines are a connection line 60 to a connection line 69. An arrow of a connection line points to a called node, and is opposite to a calling node.

For example, the connection line 60 between the node 41 and a node 44 indicates that the node 41 calls the node 44; a connection line 61 between a node 42 and a node 44 indicates that the node 42 calls the node 44.

In addition, the topology view may further include a path having at least three nodes. The path indicates an indirect call relationship from a start point of the path, to an intermediate point (there may be one or more intermediate points) of the path, and then to an end point of the path. For example, a path between the node 42 and a node 45 includes the connection line 61 between the node 42 and the node 44 and a connection line 63 between the node 44 and the node 45, which means that the node 42 calls the node 44, and the node 44 then calls the node 45, so that the node 42 indirectly calls the node 45.

In addition, the node 45 and the node 44 in the topology view has a larger size than other nodes, which means that the node 45 and the node 44 are called by all the other microservices more times; a connection line 65 between a node 46 and the node 45 has a maximum line thickness, which means that the node 46 calls the node 45 the most times. It can be seen based on FIG. 6 that, the node 45 has relatively high processing load, and requires load balance processing.

Figure 7:
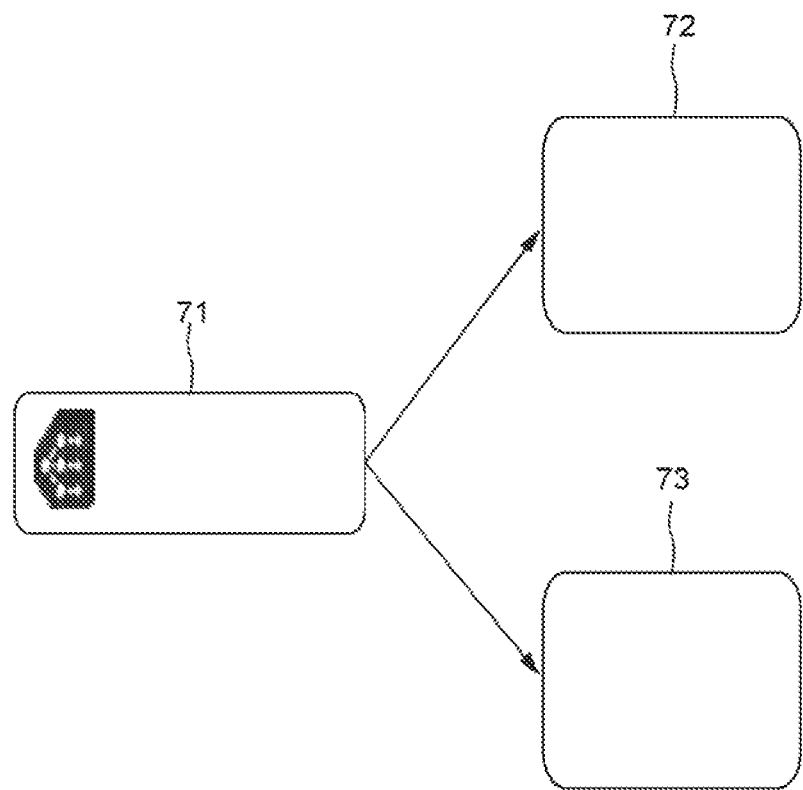
FIG. 7 is a schematic diagram of adjusting a processing capability of a microservice based on those shown in FIG. 6 according to an embodiment of the present invention.

It is assumed that the node 45 has only a first instance 72. FIG. 7 is a schematic diagram of adjusting a processing capability of a microservice based on those shown in FIG. 6 according to an implementation of an embodiment of the present invention. In FIG. 7, a load balancer 71 adjusts a processing capability of the node 45, specifically including: adding a second instance 73, and sharing the load of the node 45 between the first instance 72 and the second instance 73, to increase the processing capability of the node 45.

Figure 8:
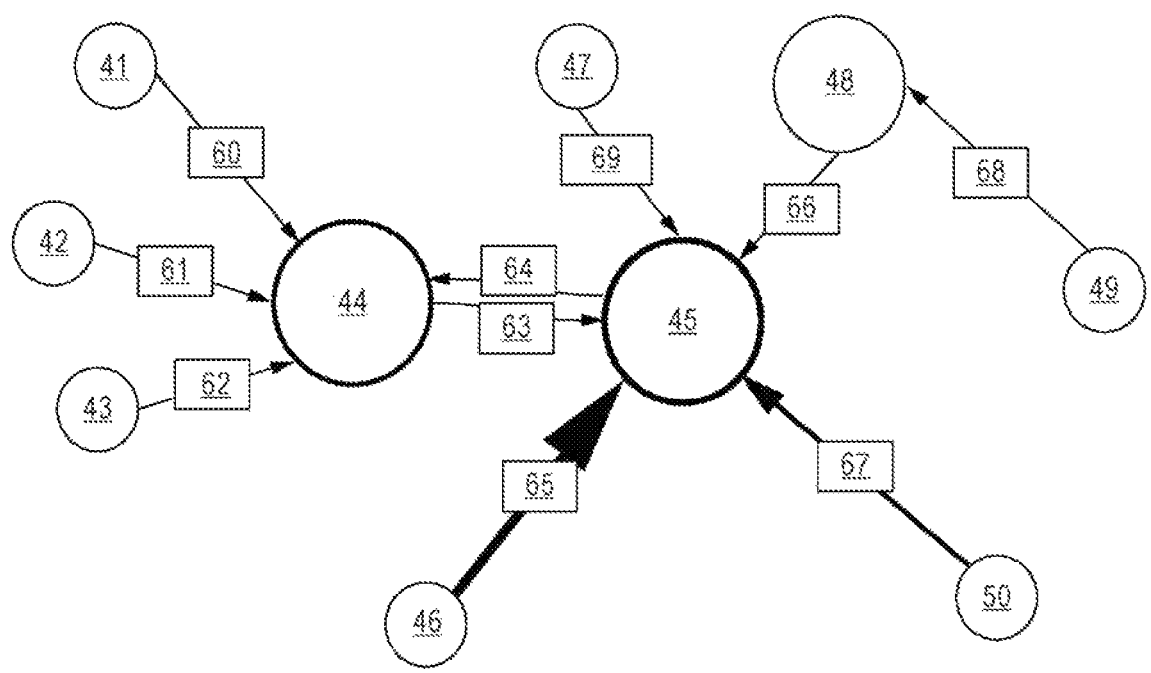
FIG. 8 is a fourth schematic topology view of displaying call information including a third-party service according to an implementation of an embodiment of the present invention.

FIG. 8 is a fourth schematic topology view of displaying call information including a third-party service according to an embodiment of the present invention. In FIG. 8, a microservice set 81 provided by a first vendor and a microservice set 82 provided by a second vendor are merged into the microservice architecture. Therefore, the microservice architecture has desired service compatibility.

Based on the foregoing analysis, an implementation of an embodiment of the present invention further provides a data sending method. The method includes: obtaining, by using a tracking component in a microservice, metadata of a microservice request sent by the microservice, where metadata of a microservice request is used to determine a call relationship between a first microservice and a second microservice, the first microservice is a microservice sending the microservice request, and the second microservice is a microservice that the microservice request requests to call; and sending the metadata by using the tracking component. The metadata of the microservice request may include: a name of a microservice that the microservice request requests to call; an interface of the microservice that the microservice request requests to call; an identifier of the microservice that the microservice request requests to call, etc.

The microservice 16 in FIG. 2 may implement the data sending method. The microservice 16 in FIG. 2 may be implemented by using one or more computer programs, and configured in one or more computing devices, which is not limited in this implementation of the present invention.

Based on the foregoing analysis, an implementation of an embodiment of the present invention further provides an information processing apparatus.

Figure 9:
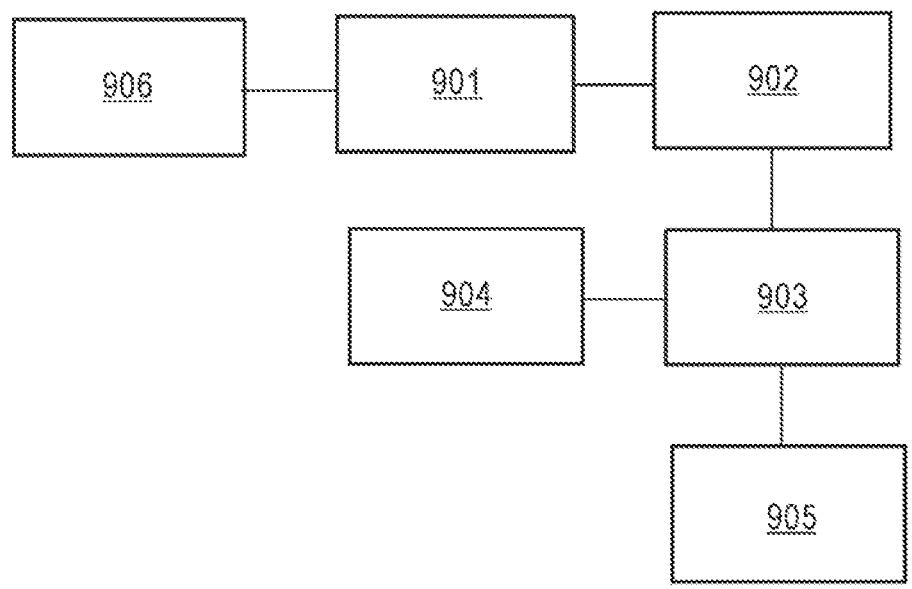
FIG. 9 is a schematic structural diagram of an information processing apparatus according to an implementation of an embodiment of the present invention.

FIG. 9 is a schematic structural diagram of an information processing apparatus according to an implementation of an embodiment of the present invention.

As shown in FIG. 9, the apparatus includes:
  a monitoring module 901, configured to monitor at least one microservice request sent by each of at least two microservices, where a microservice request is used by one microservice to call another microservice;
  a relationship determining module 902, configured to determine a call relationship between a first microservice and a second microservice from each detected microservice request, where the first microservice is a microservice sending the microservice request, and the second microservice is a microservice that the microservice request requests to call; and
  a call information generation module 903, configured to generate call information between the at least two microservices based on all determined call relationships.

In an implementation of an embodiment, the call information between the at least two microservices includes at least one of the following: a call relationship between the at least two microservices; an indirect call path between the at least two microservices; or an indicator value of calling between the at least two microservices.

In an implementation of an embodiment, the indicator value includes at least one of the following: times one of the at least two microservices calls another microservice; a frequency at which one of the at least two microservices calls another microservice; times one of the at least two microservices successfully calls another microservice; times one of the at least two microservices unsuccessfully calls another microservice; a success rate at which one of the at least two microservices calls another microservice; times one of the at least two microservices is called by all the other microservices; a frequency at which one of the at least two microservices is called by all the other microservices; times one of the at least two microservices is successfully called by all the other microservices; times one of the at least two microservices is unsuccessfully called by all the other microservices; a success rate at which one of the at least two microservices is called by all the other microservices, etc.

In an implementation of an embodiment, the indicator value includes: times one of the at least two microservices is called by all the other microservices, a frequency at which one of the at least two microservices is called by all the other microservices, times one of the at least two microservices is successfully called by all the other microservices, times one of the at least two microservices is unsuccessfully called by all the other microservices, or a success rate at which one of the at least two microservices is called by all the other microservices; and
the apparatus further includes:
a processing capability adjustment module 904, configured to: when an indicator value of a called microservice exceeds a first preset threshold, increase a processing capability of the called microservice, and/or when the indicator value of the called microservice is lower than a second preset threshold, decrease or maintain the processing capability of the called microservice, where the first preset threshold is not less than the second preset threshold.

In an implementation of an embodiment, the apparatus further includes: a display module 905, configured to: after the call information generation module generates the call information between the at least two microservices based on all the determined call relationships, display the generated call information by using at least one visual interface.

In an implementation of an embodiment, the call information between the at least two microservices includes the call relationship between the at least two microservices; and the display module 905 is configured to display, on the visual interface, a topology view of the call relationship between the at least two microservices, where nodes in the topology view are used to represent the at least two microservices, a connection line between two adjacent nodes in the topology view is used to indicate a call relationship in which a third microservice calls a fourth microservice, the third microservice is a microservice represented by a start node of the connection line, and the fourth microservice is a microservice represented by an end node of the connection line.

In an implementation of an embodiment, the call information between the at least two microservices includes the indirect call path between the at least two microservices; and the display module 905 is configured to display, on the visual interface, a path from one node to another node in the topology view, where a path is used to indicate microservices called in sequence and a call order when a fifth microservice calls a sixth microservice, the fifth microservice is a microservice represented by a start node of the path, and the sixth microservice is a microservice represented by an end node of the path.

In an implementation of an embodiment, the call information between the at least two microservices includes the indicator value of calling between the at least two microservices; and the display module 905 is configured to represent at least one of the following by using a thickness of a connection line: times one of the at least two microservices calls another microservice; a frequency at which one of the at least two microservices calls another microservice; times one of the at least two microservices successfully calls another microservice; times one of the at least two microservices unsuccessfully calls another microservice; or a success rate at which one of the at least two microservices calls another microservice; and represent at least one of the following by using a size of a node: times one of the at least two microservices is called by all the other microservices; a frequency at which one of the at least two microservices is called by all the other microservices; times one of the at least two microservices is successfully called by all the other microservices; times one of the at least two microservices is unsuccessfully called by all the other microservices; a success rate at which one of the at least two microservices is called by all the other microservices, etc.

In an implementation of an embodiment, the monitoring module 901 is configured to obtain, from a tracking component in each of at least two microservices, metadata of all microservice requests sent by the microservice in which the tracking component is located.

In an implementation of an embodiment, the apparatus further includes:
a list obtaining module 906, configured to: before the monitoring module 901 monitors the at least one microservice request sent by each of at least two microservices, obtain a list of the at least two microservices from a service discovery point, where the service discovery point is configured to register microservices; and
the monitoring module 901 is configured to obtain, from the tracking component in each microservice recorded in the list of the at least two microservices, metadata of all microservice requests sent by the microservice in which the tracking component is located.

Based on the foregoing description, an implementation of an embodiment of the present invention further provides a data sending apparatus.

Figure 10:
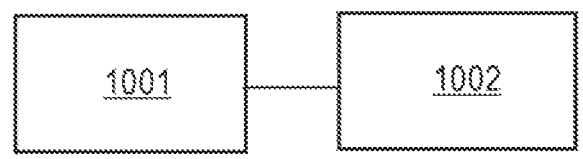
FIG. 10 is a schematic structural diagram of a data sending apparatus according to an implementation of an embodiment of the present invention.

FIG. 10 is a schematic structural diagram of a data sending apparatus according to an implementation of an embodiment of the present invention.

As shown in FIG. 10, the apparatus includes:
an obtaining module 1001, configured to obtain, by using a tracking component in a microservice, metadata of a microservice request sent by the microservice, where metadata of a microservice request is used to determine a call relationship between a first microservice and a second microservice, the first microservice is a microservice sending the microservice request, and the second microservice is a microservice that the microservice request requests to call; and
a sending module 1002, configured to send the metadata by using the tracking component.

Based on the detailed description above, an implementation of an embodiment of the present invention further provides information processing apparatus, including: at least one memory, configured to store a machine-readable instruction; and at least one processor, configured to invoke the machine-readable instruction to perform the method in any implementation above. The memory in the information processing apparatus may be a high-speed random-access memory, for example, a dynamic random-access memory (DRAM), a static random-access memory (SRAM), or another random-access solid-state storage device; or may be a non-volatile memory, for example, one or more disk storage devices, optical disk storage devices, flash memory devices, or other non-volatile storage devices.

It should be noted that, all steps and modules in the foregoing procedures and structural diagrams are not necessary, some steps or modules may be omitted depending on actual needs. An execution sequence of the steps is not fixed, and may be adjusted depending on needs. Division of the modules is merely functional division for ease of description. In actual implementation of an embodiment, one module may be implemented separately by multiple modules, and functions of multiple modules may also be implemented by one same module. The modules may be located in a same device, and may also be located in different devices.

Hardware modules in the implementations may be implemented in a mechanic manner or an electronic manner. For example, a hardware module may include a specially designed permanent circuit or logical device (for example, a dedicated processor, such as an FPGA or an ASIC) for completing a specific operation. The hardware module may also include a programmable logical device or circuit (for example, including a general processor or another programmable processor) configured temporarily by software and configured to execute a specific operation. Whether the hardware module is specifically implemented in a mechanic manner, by using a dedicated permanent circuit, or by using a temporarily-configured circuit (for example, configured by software) may be determined according to considerations of costs and time.

In addition, each implementation of embodiments of the invention may be implemented by a data processing program executed by a data processing device such as a computer. Apparently, the data processing program constitutes this invention. In addition, generally, a data processing program stored in a storage medium is directly read from the storage medium for execution or the program is installed on or replicated to a storage device (such as a hard disk or memory) of a data processing device for execution. Therefore, such a storage medium also constitutes this invention. This application further provides a non-volatile storage medium storing a data processing program. The data processing program can be used to perform any one of the foregoing method examples in the implementations of embodiments of the present invention.

An embodiment of the present invention further provides a machine-readable storage medium storing an instruction causing a machine to perform any method of an above embodiment. Specifically, a system or an apparatus that is equipped with a storage medium may be provided. The storage medium stores software program code that implements functions of any implementation in the foregoing embodiments, and a computer (a CPU or an MPU) of the system or the apparatus is enabled to read and execute the program code stored in the storage medium. In addition, a program code based instruction may also be used to enable an operating system or the like running in the computer to complete some or all actual operations. The program code read from the storage medium may also be written to a memory that is disposed in an extension board inserted in the computer, or may be written to a memory that is disposed in an extension unit connected to the computer, and then a CPU or the like that is installed on the extension board or extension unit may be enabled to execute some or all actual operations based on the instruction of the program code, so as to implement the functions of any implementation in the foregoing embodiments.

Implementations of embodiments of the storage medium for providing the program code may include a floppy disk, a hard disk, a magneto-optical disk, an optical memory (such as a CD-ROM, a CD-R, a CD-RW, a DVD-ROM, a DVD-RAM, a DVD-RW, and a DVD+RW), a magnetic tape, a non-volatile storage card, and a ROM. Optionally, the program code may be downloaded from a server computer over a communications network.

The foregoing descriptions are merely example embodiments of the present invention, but are not intended to limit the protection scope of the present invention. Any modification, equivalent replacement, or improvement made without departing from the spirit and principle of the present invention shall fall within the protection scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. An information processing method, comprising:
 monitoring at least one microservice request sent by each of at least a first microservice and a second microservice, wherein a microservice request is used by a microservice to call another microservice;

determining a call relationship between the first microservice and the second microservice based on the at least one microservice request, wherein the first microservice is a microservice sending the at least one microservice request, and the second microservice is a microservice that the at least one microservice request requests to call;

generating call information between the first microservice and the second microservice based on the call relationship; and at least one of (i) increasing a processing capability of the second microservice in response to an indicator value of the second microservice exceeding a first threshold, or (ii) decreasing or maintaining the processing capability of the second microservice in response to the indicator value of the second microservice being lower than a second threshold;

wherein the first threshold is not less than the second threshold;

wherein the call information between the first microservice and the second microservice includes at least one of (i) the call relationship between the first microservice and the second microservice, (ii) an indirect call path between the first microservice and the second microservice, or (iii) an indicator value of calling between the first microservice and the second microservice; and wherein the indicator value of the second microservice includes at least one of
- a number of times the second microservice is called by other microservices,
- a frequency at which the second microservice is called by other microservices,
- a number of times the second microservice is successfully called by other microservices,
- a number of times the second microservice is unsuccessfully called by other microservices, or
- a success rate at which the second microservice is called by all other microservices.

2. The method of claim 1, wherein after the generating the call information between the first microservice and the second microservice, the method further comprises:

displaying the call information using at least one visual interface, wherein the call information between the first microservice and the second microservice includes the call relationship between the first microservice and the second microservice; and wherein the displaying the call information includes
displaying, on the at least one visual interface, a topology view of the call relationship between the first microservice and the second microservice, nodes in the topology view representing the first microservice and the second microservice, and a connection line between two adjacent nodes in the topology view indicating a call relationship between a third microservice calling a fourth microservice, the third microservice being represented by a start node of the connection line, and the fourth microservice being represented by an end node of the connection line.

3. The method of claim 2, wherein
the call information between the first microservice and the second microservice further includes the indirect call path between the first microservice and the second microservice; and the displaying the call information further includes
displaying, on the at least one visual interface, a path from one node to another node in the topology view, the path indicating microservices called in sequence and a call order when a fifth microservice calls a sixth microservice, the fifth microservice being represented by a start node of the path, and the sixth microservice being represented by an end node of the path.

4. The method of claim 2, wherein
the call information between the first microservice and the second microservice includes the indicator value of calling between the first microservice and the second microservice; and the displaying the call information further includes
representing, using a thickness of a connection line, at least one of
- a number of times one of the first microservice and the second microservice calls another microservice,
- a frequency at which one of the first microservice and the second microservice calls another microservice,
- a number of times one of the first microservice and the second microservice successfully calls another microservice,
- a number of times one of the first microservice and the second microservice unsuccessfully calls another microservice, and
- a success rate at which one of the first microservice and the second microservice calls another microservice; and representing, using a size of a node, at least one of
- a number of times one of the first microservice and the second microservice is called by other microservices,
- a frequency at which one of the first microservice and the second microservice is called by other microservices,
- a number of times one of the first microservice and the second microservice is successfully called by other microservices,
- a number of times one of the first microservice and the second microservice is unsuccessfully called by other microservices, and
- a success rate at which one of the first microservice and the second microservice is called by other microservices.

5. The method of claim 1, wherein
the monitoring at least one microservice request sent by each of at least the first microservice and the second microservice includes obtaining, from a tracking component in each of the first microservice and the second microservice, metadata of all microservice requests sent in which the tracking component is located; and the method further includes obtaining a list, including at least the first microservice and the second microservice, from a service discovery point, the service discovery point configured to register microservices; and the obtaining, from a tracking component in each of the first microservice and the second microservice, metadata of all microservice requests sent in which the tracking component is located includes obtaining, from the tracking component in each microservice recorded in the list, metadata of all microservice requests sent in which the tracking component is located.

6. An information processing apparatus, comprising:
at least one memory configured to store machine-readable instructions; and
at least one processor configured to execute the machine-readable instructions to cause the information processing apparatus to
monitor at least one microservice request sent by each of at least a first microservice and a second microservice, wherein a microservice request is used by one microservice to call another microservice,
determine a call relationship between the first microservice and the second microservice based on the at least one microservice request, wherein the first microservice is a microservice sending the at least one microservice request, and the second microservice is a microservice that the at least one microservice request requests to call,
generate call information between the first microservice and the second microservice based on the call relationship, and
at least one of (i) increase a processing capability of the second microservice in response to an indicator value of the second microservice exceeding a first threshold, or (ii) decrease or maintain the processing capability of the second microservice in response to the indicator value of the second microservice being lower than a second threshold;
wherein the first threshold is not less than the second threshold;
wherein the call information between the first microservice and the second microservice includes at least one of (i) the call relationship between the first microservice and the second microservice, (ii) an indirect call path between the first microservice and the second microservice, or (iii) an indicator value of calling between the first microservice and the second microservice; and
wherein the indicator value of the second microservice includes at least one of
a number of times the second microservice is called by other microservices,
a frequency at which the second microservice is called by other microservices,
a number of times the second microservice is successfully called by other microservices,
a number of times the second microservice is unsuccessfully called by other microservices, or
a success rate at which the second microservice is called by all other microservices.

7. The information processing apparatus of claim 6, wherein
the at least one processor is further configured to execute the machine-readable instructions to cause the information processing apparatus to
display the call information by using at least one visual interface, wherein the call information between the first microservice and the second microservice includes the call relationship between the first microservice and the second microservice; and
when displaying the call information by using the at least one visual interface, the at least one processor is further configured to execute the machine-readable instructions to cause the information processing apparatus to display, on the at least one visual interface, a topology view of the call relationship between the first microservice and the second microservice, wherein nodes in the topology view are used to represent the first microservice and the second microservice, and a connection line between two adjacent nodes in the topology view is used to indicate a call relationship in which a third microservice calls a fourth microservice, the third microservice being represented by a start node of the connection line, and the fourth microservice being represented by an end node of the connection line.

8. The information processing apparatus of claim 7, wherein the call information between the first microservice and the second microservice further includes the indirect call path between the first microservice and the second microservice; and
upon displaying the call information by using the at least one visual interface, the at least one processor is configured to execute the machine-readable instructions to cause the information processing apparatus to display, on the at least one visual interface, a path from one node to another node in the topology view, wherein a path is used to indicate microservices called in sequence and a call order when a fifth microservice calls a sixth microservice, the fifth microservice being represented by a start node of the path, and the sixth microservice being represented by an end node of the path.

9. The information processing apparatus of claim 7, wherein the call information between the first microservice and the second microservice includes the indicator value of calling between the first microservice and the second microservice; and
upon displaying the call information by using the at least one visual interface, the at least one processor is further configured to execute the machine-readable instructions to
represent, using a thickness of a connection line, at least one of
a number of times one of the first microservice and the second microservice calls another microservice, a frequency at which one of the first microservice and the second microservice calls another microservice,
a number of times one of the first microservice and the second microservice successfully calls another microservice,
a number of times one of the first microservice and the second microservice unsuccessfully calls another microservice, and
a success rate at which one of the first microservice and the second microservice calls another microservice; and
represent, using a size of a node, at least one of
a number of times one of the first microservice and the second microservice is called by other microservices,
a frequency at which one of the first microservice and the second microservice is called by other microservices,
a number of times one of the first microservice and the second microservice is successfully called by other microservices,
a number of times one of the first microservice and the second microservice is unsuccessfully called by other microservices, and
a success rate at which one of the first microservice and the second microservice is called by other microservices.

10. The information processing apparatus of claim 6, wherein
upon monitoring the at least one microservice request sent by each of the first microservice and the second microservice, the at least one processor is further configured to execute the machine-readable instructions to cause the information processing apparatus to obtain, from a tracking component in each of the first microservice and the second microservice, metadata of all microservice requests sent in which the tracking component is located,
wherein, before the monitoring, the at least one processor is further configured to execute the machine-readable instructions to cause the information processing apparatus to obtain a list, including at least the first microservice and the second microservice, from a service discovery point, wherein the service discovery point is configured to register microservices; and
wherein upon obtaining, from the tracking component in each of the first microservice and the second microservice, metadata of all microservice requests sent in which the tracking component is located, the at least one processor is further configured to execute the machine-readable instructions to cause the information processing apparatus to obtain, from the tracking component in each microservice recorded in the list, metadata of all microservice requests sent in which the tracking component is located.

11. A non-transitory storage medium, storing machine-readable instructions to perform, when executed by a processor, at least:
monitoring at least one microservice request sent by each of at least a first microservice and a second microservice, wherein a microservice request is used by a microservice to call another microservice;
determining a call relationship between the first microservice and the second microservice based on the at least one microservice request, wherein the first microservice is a microservice sending the at least one microservice request, and the second microservice is a microservice that the at least one microservice request requests to call;
generating call information between the first microservice and the second microservice based on the call relationship; and
at least one of (i) increasing a processing capability of the second microservice in response to an indicator value of the second microservice exceeding a first threshold, or (ii) decreasing or maintaining the processing capability of the second microservice in response to the indicator value of the second microservice being lower than a second threshold;
wherein the first threshold is not less than the second threshold;
wherein the call information between the first microservice and the second microservice includes at least one of (i) the call relationship between the first microservice and the second microservice, (ii) an indirect call path between the first microservice and the second microservice, or (iii) an indicator value of calling between the first microservice and the second microservice; and
wherein the indicator value of the second microservice includes at least one of
a number of times the second microservice is called by other microservices,
a frequency at which the second microservice is called by other microservices,
a number of times the second microservice is successfully called by other microservices,
a number of times the second microservice is unsuccessfully called by other microservices, or
a success rate at which the second microservice is called by all other microservices.

12. The non-transitory storage medium of claim 11, wherein
the machine-readable instructions, when executed by the processor, cause the processor to display the call information by using at least one visual interface after generating the call information between the first microservice and the second microservice, wherein the call information includes the call relationship between the first microservice and the second microservice; and
display of the call information includes displaying, on the at least one visual interface, a topology view of the call relationship between the first microservice and the second microservice, wherein nodes in the topology view are used to represent the first microservice and the second microservice, and a connection line between two adjacent nodes in the topology view is used to indicate a call relationship in which a third microservice calls a fourth microservice, the third microservice being represented by a start node of the connection line, and the fourth microservice being represented by an end node of the connection line.

13. The non-transitory storage medium of claim 12, wherein
the call information between the first microservice and the second microservice further includes the indirect call path between the first microservice and the second microservice; and
display of the call information by using the at least one visual interface includes displaying, on the at least one visual interface, a path from one node to another node in the topology view, wherein a path is used to indicate microservices called in sequence and a call order when a fifth microservice calls a sixth microservice, the fifth microservice being represented by a start node of the path, and the sixth microservice being represented by an end node of the path.

14. The non-transitory storage medium of claim 12, wherein
the call information between the first microservice and the second microservice includes the indicator value of calling between the first microservice and the second microservice; and
display of the call information by using the at least one visual interface includes
representing, using a thickness of a connection line, at least one of
a number of times one of the first microservice and the second microservice calls another microservice,
a frequency at which one of the first microservice and the second microservice calls another microservice,
a number of times one of the first microservice and the second microservice successfully calls another microservice,
a number of times one of the first microservice and the second microservice unsuccessfully calls another microservice, and a success rate at which one of the first microservice and the second microservice calls another microservice, and representing, using a size of a node, at least one of
- a number of times one of the first microservice and the second microservice is called by other microservices,
- a frequency at which one of the first microservice and the second microservice is called by other microservices
- a number of times one of the first microservice and the second microservice is successfully called by other microservices,
- a number of times one of the first microservice and the second microservice is unsuccessfully called by other microservices, and
- a success rate at which one of the first microservice and the second microservice is called by other microservices.

* * * * *